US007385644B2

(12) United States Patent
Tamura

(10) Patent No.: US 7,385,644 B2

(45) Date of Patent: Jun. 10, 2008

(54) IMAGE PICK-UP DEVICE WITH CHANGEABLE POWER SUPPLY CABLE

(75) Inventor: Shigeru Tamura, Tokyo (JP)

(73) Assignee: Sony Corporation, Tokyo (JP)

( * ) Notice: Subject to any disclaimer, the term of this patent is extended or adjusted under 35 U.S.C. 154(b) by 513 days.

(21) Appl. No.: 10/513,192

(22) PCT Filed: Mar. 2, 2004

(86) PCT No.: PCT/JP2004/002553

§ 371 (c)(1),
(2), (4) Date: Nov. 1, 2004

(87) PCT Pub. No.: WO2004/086753

PCT Pub. Date: Oct. 7, 2004

(65) Prior Publication Data

US 2005/0174476 A1 Aug. 11, 2005

(30) Foreign Application Priority Data

Mar. 3, 2003 (JP) ............................ 2003-056241

(51) Int. Cl.
*H04N 5/225* (2006.01)
*H04N 7/18* (2006.01)
*H04N 9/47* (2006.01)

(52) U.S. Cl. ...................................... 348/373; 348/151

(58) Field of Classification Search ................ 348/143, 348/373, 374, 375, 151; D16/203
See application file for complete search history.

(56) References Cited

U.S. PATENT DOCUMENTS

2001/0022627 A1* 9/2001 Bernhardt .................. 348/373

FOREIGN PATENT DOCUMENTS

| | | |
|---|---|---|
| JP | 2000-350058 | 12/2000 |
| JP | 2001-238101 | 8/2001 |
| JP | 2001-346074 | 12/2001 |
| JP | 2004-48111 | 2/2004 |

* cited by examiner

*Primary Examiner*—Ngoc-Yen Vu
*Assistant Examiner*—James A Meyers
(74) *Attorney, Agent, or Firm*—Frommer Lawrence & Haug LLP; William S. Frommer; Ellen Marcie Emas

(57) ABSTRACT

The present invention concerns a monitoring camera for picking up the image of an environment inside or outside a building. A ceiling part (13) is provided in one end side in the longitudinal direction of a rectangular main body part (11). On the other end side, a bottom surface part (14) is provided. Since an image pickup part (12) is provided in the front part of the main body part (11) held between the ceiling part (13) and the bottom surface part (14), the monitoring camera can be disposed along an outer wall (2). The monitoring camera (10) has a power supply part (37) contained in the ceiling part (13) and a control circuit part (29) contained in the main body part (11) provided in the lower part of the power supply part (37). Thus, the control circuit part (29) can be protected from the heat generation of the power supply part (37).

3 Claims, 10 Drawing Sheets

IMAGE PICK-UP DEVICE WITH CHANGEABLE POWER SUPPLY CABLE

TECHNICAL FIELD

The present invention relates to an image pickup device used as a monitoring camera or the like.

This application claims a priority based on Japanese Patent Application No. 2003-56241 filed on Mar. 3, 2003, the entirety of which is incorporated herein by reference.

BACKGROUND ART

A monitoring camera conventionally disposed and used inside or outside a building has been proposed. The monitoring camera of this kind has been installed indoors or outdoors for a long period. Especially when the monitoring camera is installed outdoors, the monitoring camera may be possibly exposed to the environment of extremely high temperature and high humidity or extremely low temperature and low humidity for a long period. In the monitoring camera that may be installed in such a severe environment, internally accommodated parts in which electric circuits are incorporated or an image pickup device need to be protected from the severe environment. Thus, a water-proof monitoring camera is proposed.

Specifically, as the monitoring camera, there is a monitoring camera having a dome shaped casing and an image pickup device incorporated in the dome shaped casing and disposed on a ceiling part or the like. The monitoring camera of this type is disposed on the ceiling part or the like to pickup the image of a lower part from the ceiling. Further, as the monitoring camera, there is a monitoring camera of a type that has an image pickup device incorporated in a substantially rectangular casing to pickup the image of a slanting lower part from an upper part. All of these monitoring cameras need to pickup the image of wide range of environment. Thus, the monitoring camera for picking up the image of the lower part from the ceiling is provided with a panning and/or tilting mechanism of the image pickup device in the casing. Further, the monitoring camera adapted to pickup the image of the slanting lower part from the upper part is provided with a panning and/or tilting mechanism outside the casing in which the image pickup device is accommodated. Further, any of the monitoring cameras includes a power supply part in which electric power is supplied to the casing from outside through a power supply cable and a control circuit part of the image pickup device.

The monitoring cameras have not been conventionally installed along a substantially vertical wall, for instance, along the wall of a building.

Further, since any of the monitoring cameras includes the panning and/or tilting mechanism of the image pickup device, consumed electric power is undesirably increased and heat generation energy from the power supply part in the casing is undesirably increased. Accordingly, the control circuit part and the image pickup device may be possibly failed due to the heat generation from the power supply part.

Still further, any of the monitoring cameras has the power supply cable. The power supply cable needs to be electrically connected to a plug socket in the vicinity of a position where the monitoring camera is installed. Various distances are provided between the position where the monitoring camera is installed and the plug socket. When the distance from the position where the monitoring camera is installed to the plug socket is long and the length of the existing power supply cable is insufficient, the existing power supply cable needs to be replaced by a long power supply cable. Further, since the casing of the water-proof monitoring camera is sealed to prevent the entry of water content to an inner part, it has been an extremely troublesome work to detach a part of the casing and change the power supply cable to a new power supply cable. Further, when the monitoring camera is made compact, the casing is also made compact. Thus, a part of the casing interferes with the work so that the changing work of the power supply cable is difficult.

DISCLOSURE OF THE INVENTION

It is an object of the present invention to provide a new image pickup device that can solve the above-described problems of the prior art.

It is another object of the present invention to provide an image pickup device in which a power supply part as a heat generating source is disposed in a ceiling side to protect a control circuit part in a main body part from heat.

It is a still another object of the present invention to provide an image pickup device in which a power supply cable can be easily changed to a new power supply cable.

An image pickup device according to the present invention comprises: a main body part in which a control circuit part is housed; an image pickup part for housing an image pickup element in the front surface side of the main body part and having a front surface formed in a substantially spherical surface with a light transmitting property; a ceiling part provided in the upper side of the main body part and the image pickup part and having a power supply part housed therein; and a bottom surface part disposed in the lower side of the main body part and the image pickup part. Accordingly, the image pickup device can be disposed along a wall surface. Further, the power supply part is disposed in the upper side of the control circuit part so that the control circuit part is prevented from being failed due to heat generated by the power supply part.

The main body part includes a back surface panel forming a part of an outer casing, and the ceiling part includes a top plate panel forming a part of the outer casing and the back surface panel and the top plate panel may be detachable.

Further, the main body part includes a base substantially vertically fixed to the bottom surface part, and a first rotary support plate having the control circuit part and supported on the bottom surface side of the base so as to freely rotate. The ceiling part includes the power supply part and a second rotary support plate supported on the ceiling part side of the base so as to freely rotate and having a rotary area regulated by the first rotary support plate. When the back surface panel and the top plate panel are attached, the first rotary support plate is in a state substantially parallel to the base and the second rotary support plate is in a state substantially vertical to the base. When the back surface panel and the top plate panel are detached, the first rotary support plate can rotate so as to be separated from the base and the second rotary support plate can rotate so as to be continuously connected to the base.

When the second rotary support plate is in the state substantially vertical to the base, a connector is electrically connected to the power supply part in a position where a power supply cable is drawn out forward. Thus, the second rotary support plate is rotated so as to be continuously connected to the base, so that the connector can be easily detachably attached.

Still another objects of the present invention and specific advantages obtained by the present invention will become more apparent from the explanation of embodiments described with reference to the drawings.

BEST MODE FOR CARRYING OUT THE INVENTION

Now, an image pickup device according to the present invention will be described below by applying it to a monitoring camera as an example.

Figure 1:
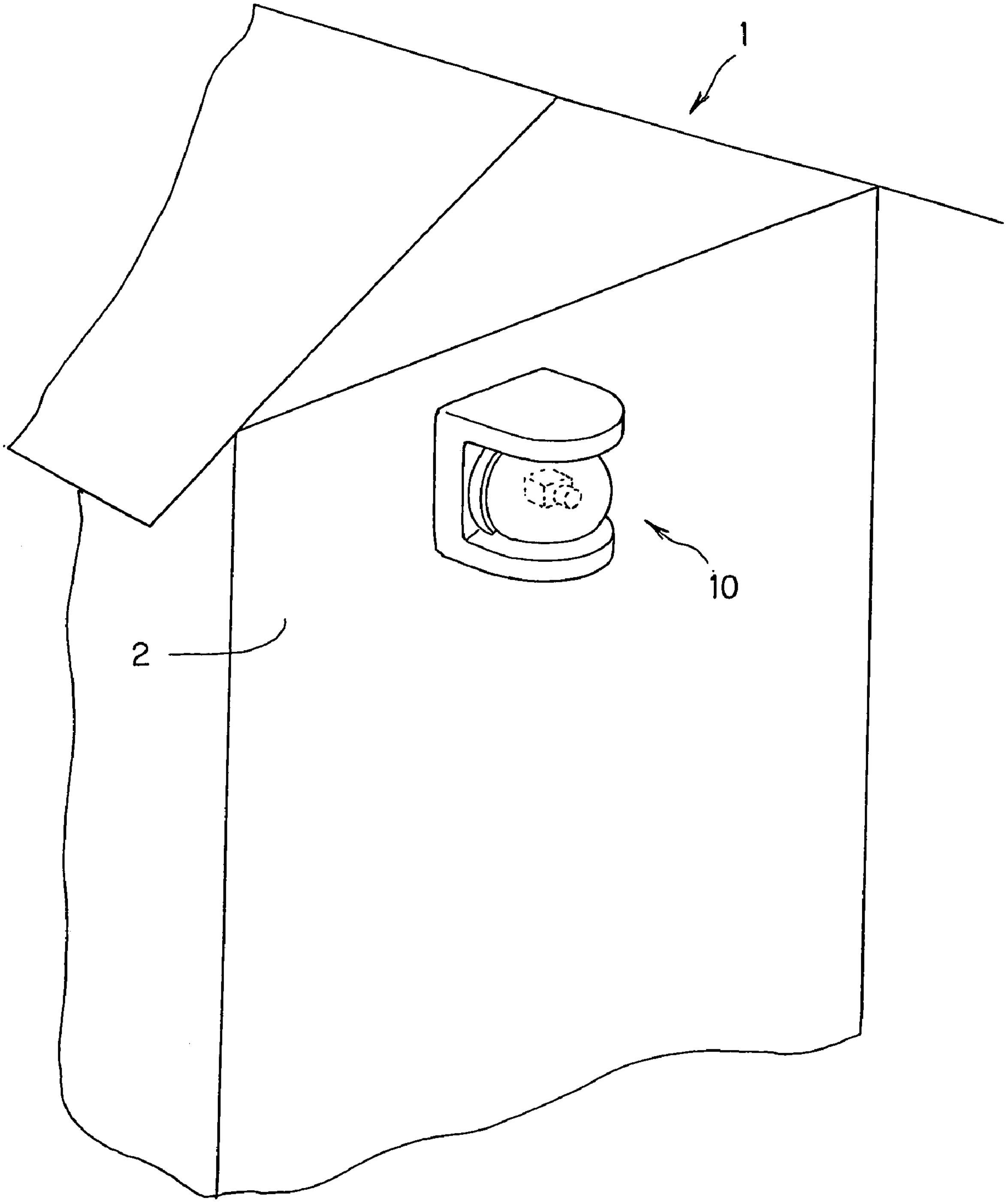
FIG. 1 is a view for explaining the installed state of a monitoring camera to which the present invention is applied.

The monitoring camera 10 to which the present invention is applied is disposed outside a building as shown in FIG. 1. The monitoring camera 10 is disposed in the upper part of an outer wall 2 near the roof of a building 1 such as a warehouse. The monitoring camera picks up the image of an area of a wide range from a position in which the monitoring camera is installed to a slantingly lower part.

Figure 2:
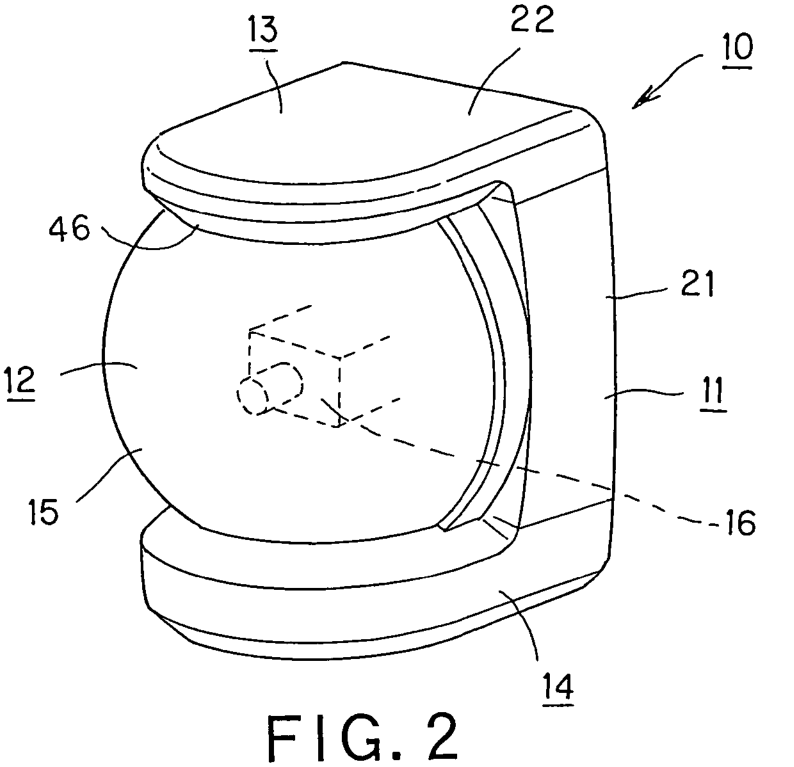
FIG. 2 is a perspective view of the monitoring camera viewed from a front surface side thereof.
Figure 3:
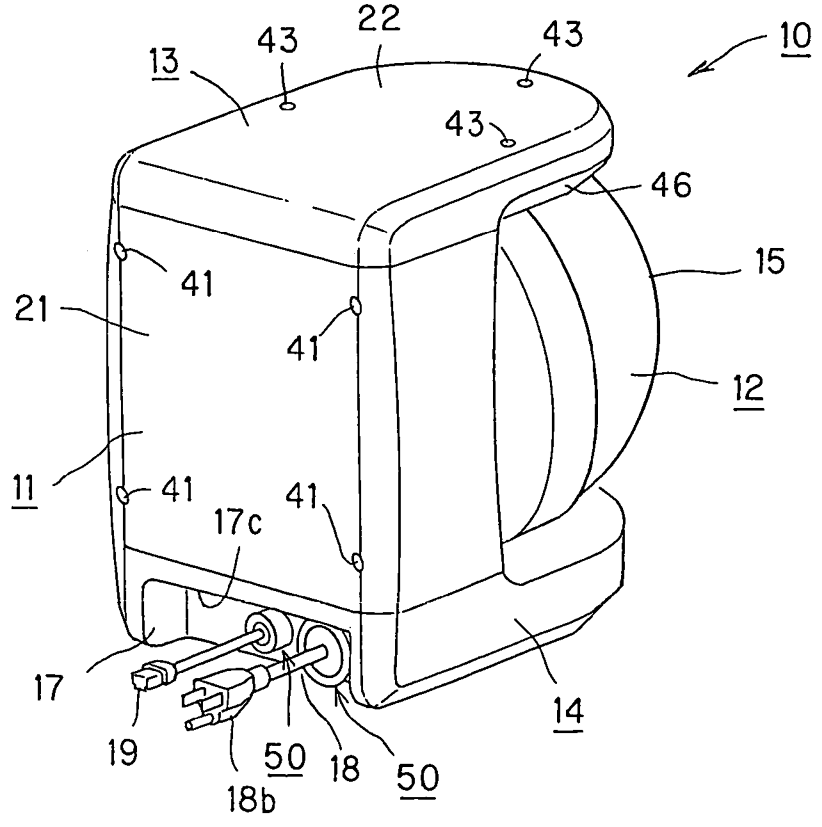
FIG. 3 is a perspective view of the monitoring camera viewed from a back surface side thereof.

The monitoring camera 10 includes, as shown in FIGS. 2 and 3, a substantially rectangular main body part 11, an image pickup part 12 disposed in the front part of the main body part 11, a ceiling part 13 provided in the upper side of the main body part 11 and the image pickup part 12, and a bottom surface part 14 provided in the lower side of the main body part 11 and the image pickup part 12.

The main body part 11 is formed in a substantially rectangular shape. A back surface side is formed to be substantially flush with an outer wall 2 of a building 1 so as to be installed on the outer wall 2. In the main body part 11, a control circuit or the like for controlling the entire part of the monitoring camera 10 is mainly contained.

The image pickup part 12 provided in the front part of the main body part 11 includes a light transmitting part 15 made of a light transmitting synthetic resin plate that is formed integrally with the main body part 11. In the light transmitting part 15, a digital still camera having an image pickup element composed of a CCD (Charge-Coupled Devices) as an image pickup equipment 16 is accommodated. The image pickup element 16 has a zoom function to record and enlarge the image of a remote subject. The image pickup equipment 16 having the zoom function has a small angle of view. Thus, in the image pickup part 12, a panning and/or tilting mechanism, which is not illustrated in the drawing, for rotating the image pickup equipment 16 in a panning direction and/or a tilting direction is provided. The light transmitting part 15 is formed in a substantially spherical surface so that the ranges of upper, lower, right and left parts in which an image can be picked up in the image pickup equipment 16 movable by the panning and/or tilting mechanism can be enlarged as much as possible.

Figure 4:
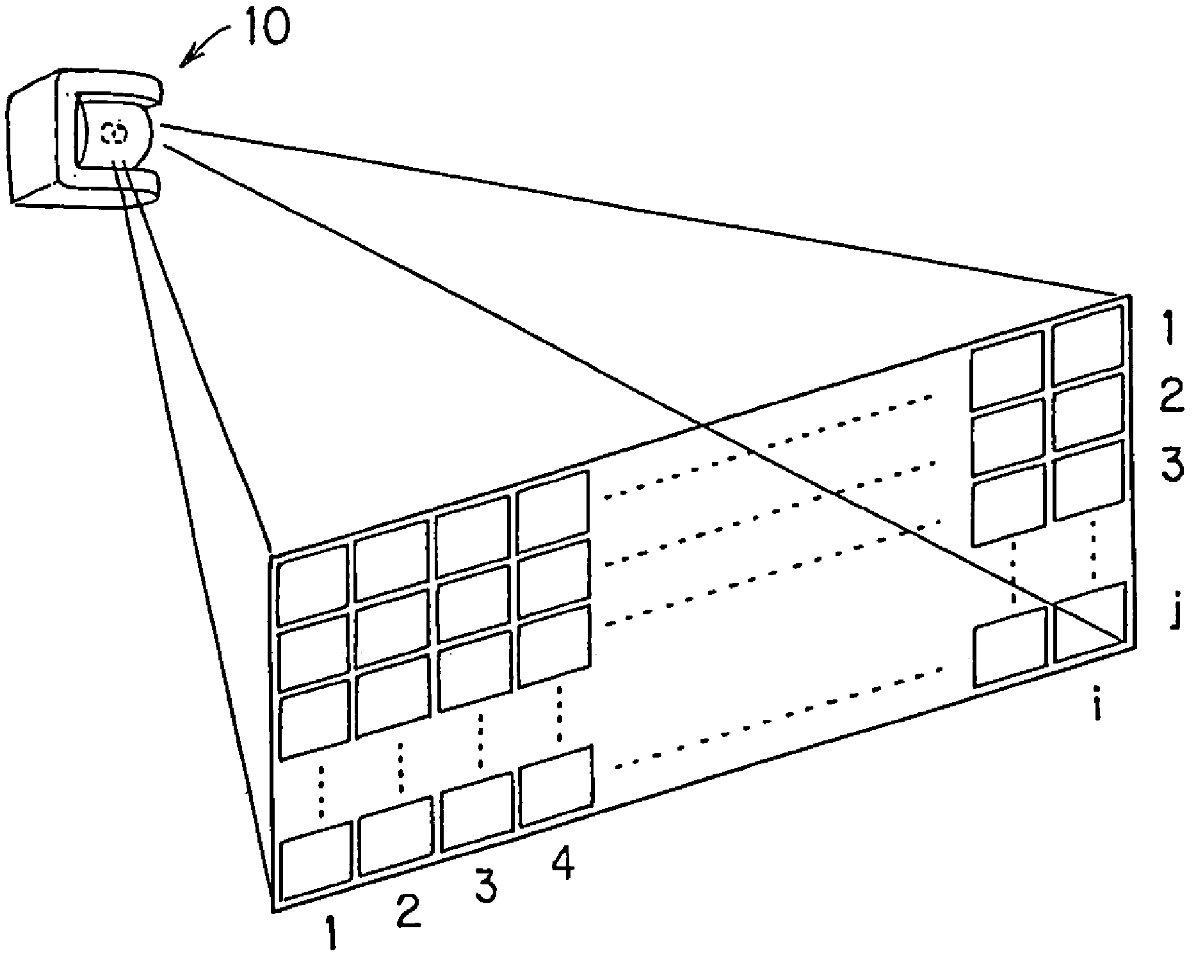
FIG. 4 is a perspective view showing an area in which the monitoring camera can pickup an image.

The monitoring camera 10 picks up 1 to i pieces of images of, for instance, a left side to a right side by moving the image pickup equipment 16 using the panning and/or tilting mechanism as shown in FIG. 4 and further picks up 1 to j pieces of images from an upper side to a lower side. Then, the monitoring camera 10 outputs the images to an image display device, arranges the 1 to i pieces of the images and the 1 to j pieces of the images in the form of a matrix and displays them at one time. The monitoring camera 10 arranges the images picked up as described above in view of elapse time. Thus, a viewer can easily identify the change of the images.

As the image pickup equipment 16, an analog still camera may be used as well as the digital still camera. Further, a digital or an analog video camera may be used.

As shown in FIGS. 2 and 3, the ceiling part 13 is provided in the upper side of the main body part 11 and the image pickup part 12. An end side of the ceiling part is formed in a substantially circular arc shape. In the ceiling part 13, a power supply part for supplying electric power to the control circuit part, the image pickup equipment 16 and the panning and/or tilting mechanism is contained. The power supply part is a part for most generating heat among parts contained in a casing. Hot air discharged from the power supply part moves upward. Thus, in the monitoring camera 10, the power supply part is disposed in the ceiling part 13 and located in the upper side of the control circuit part or the image pickup equipment 16 in the main body part 11. Thus, the control circuit part or the image pickup equipment 16 does not undergo a damage by heat. Further, the end part of the ceiling part 13 is projected from the base end part of the light transmitting part 15 to form a roof part of the light transmitting part 15.

The bottom surface part 14 is provided in the lower side of the main body part 11 and the image pickup part 12 and the end side of the bottom surface part is formed in a substantially circular arc shape like the ceiling part 13. For instance, when the monitoring camera 10 is installed on an installing base, the bottom surface part 14 functions as a support base of the monitoring camera 10. Further, the end part of the bottom surface part 14 is also projected from the base end part of the light transmitting part 15 like the ceiling part 13 to form a protecting part for preventing foreign materials from adhering to the light transmitting part 15 from a lower part.

In the corner part of the back surface side of the bottom surface part 14, a recessed part 17 is provided. From this recessed part 17, a power supply cable 18 electrically connected to the power supply part disposed in the ceiling part 13 is drawn outside. A network cable 19 electrically connected to the control circuit part disposed in the main body part 11 is drawn outside.

Further, a heat radiating member for radiating internal heat to an outer part may be drawn out from the recessed part 17.

Figure 5:
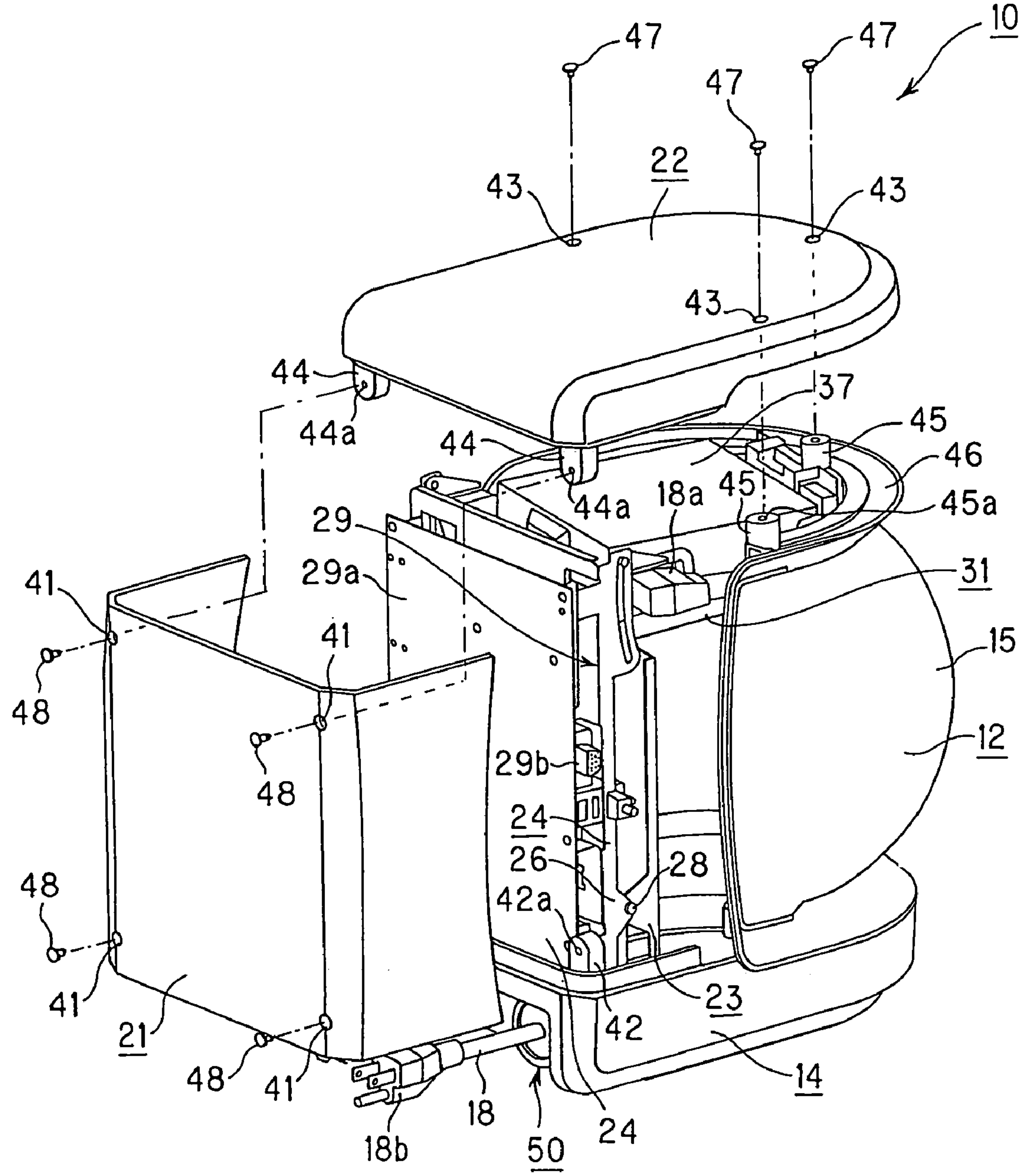
FIG. 5 is an exploded perspective view showing the monitoring camera.

In the above-described monitoring camera 10, the control circuit part in the main body part 11, the power supply part of the ceiling part 13 or the power supply cable 18 may need to be repaired or replaced by a new member. Further, when the monitoring camera 10 is installed on the outer wall 2 of the building 1, since the monitoring camera is remote from a plug socket and the length of an existing power supply cable is insufficient, the power supply cable may possibly need to be replaced by a long power supply cable. For these works, as shown in FIG. 5, the main body part 11 is formed so that a back surface panel 21 forming a part of the outer casing of the main body part 11 and a top plate panel 22 forming a part of the outer casing of the ceiling part 13 can be easily detachably attached to the main body part 11 and the ceiling part 13, respectively.

Figure 6:
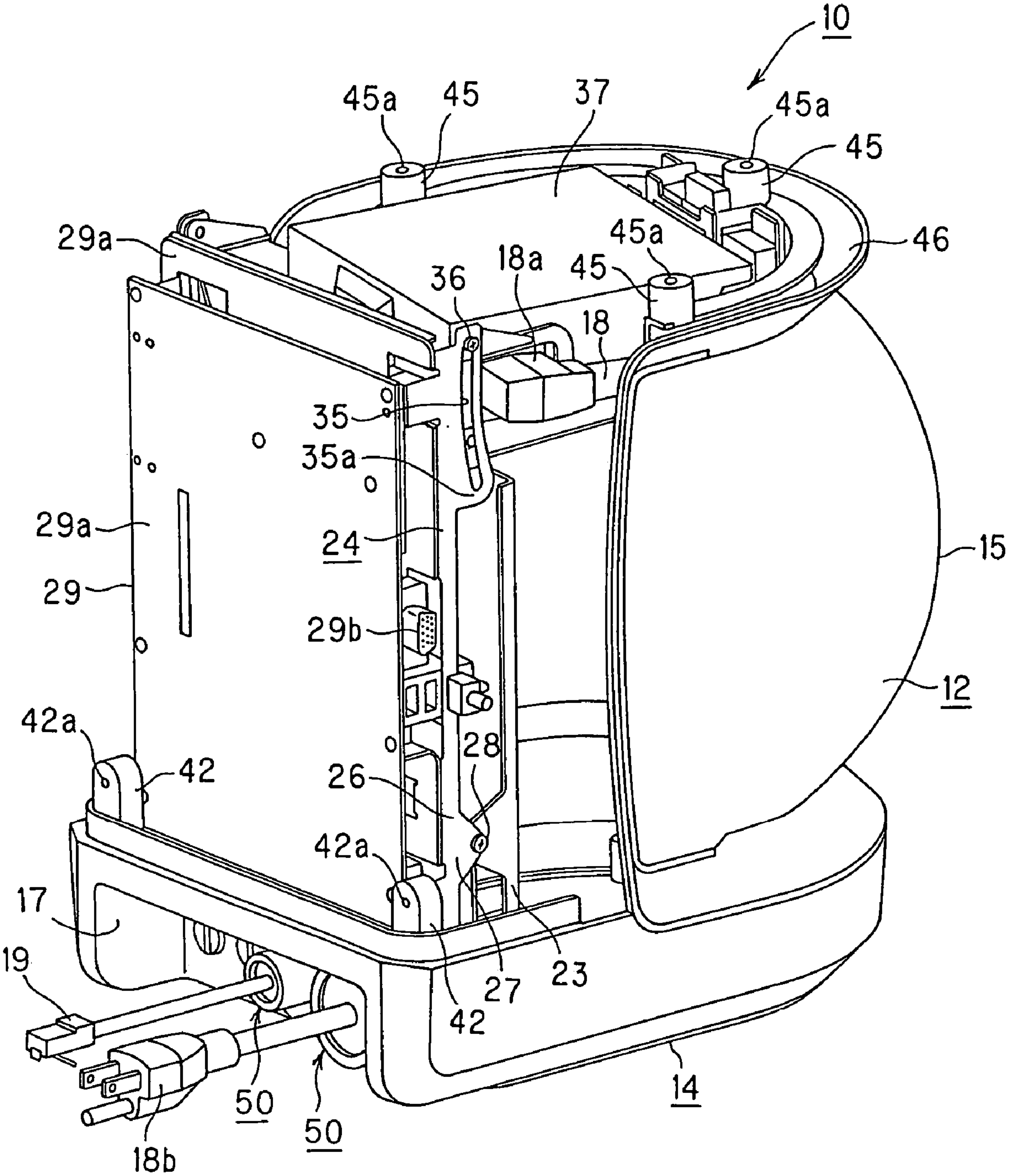
FIG. 6 is a perspective view showing a state that a back surface panel and a top plate panel of the monitoring camera are detached.
Figure 7:
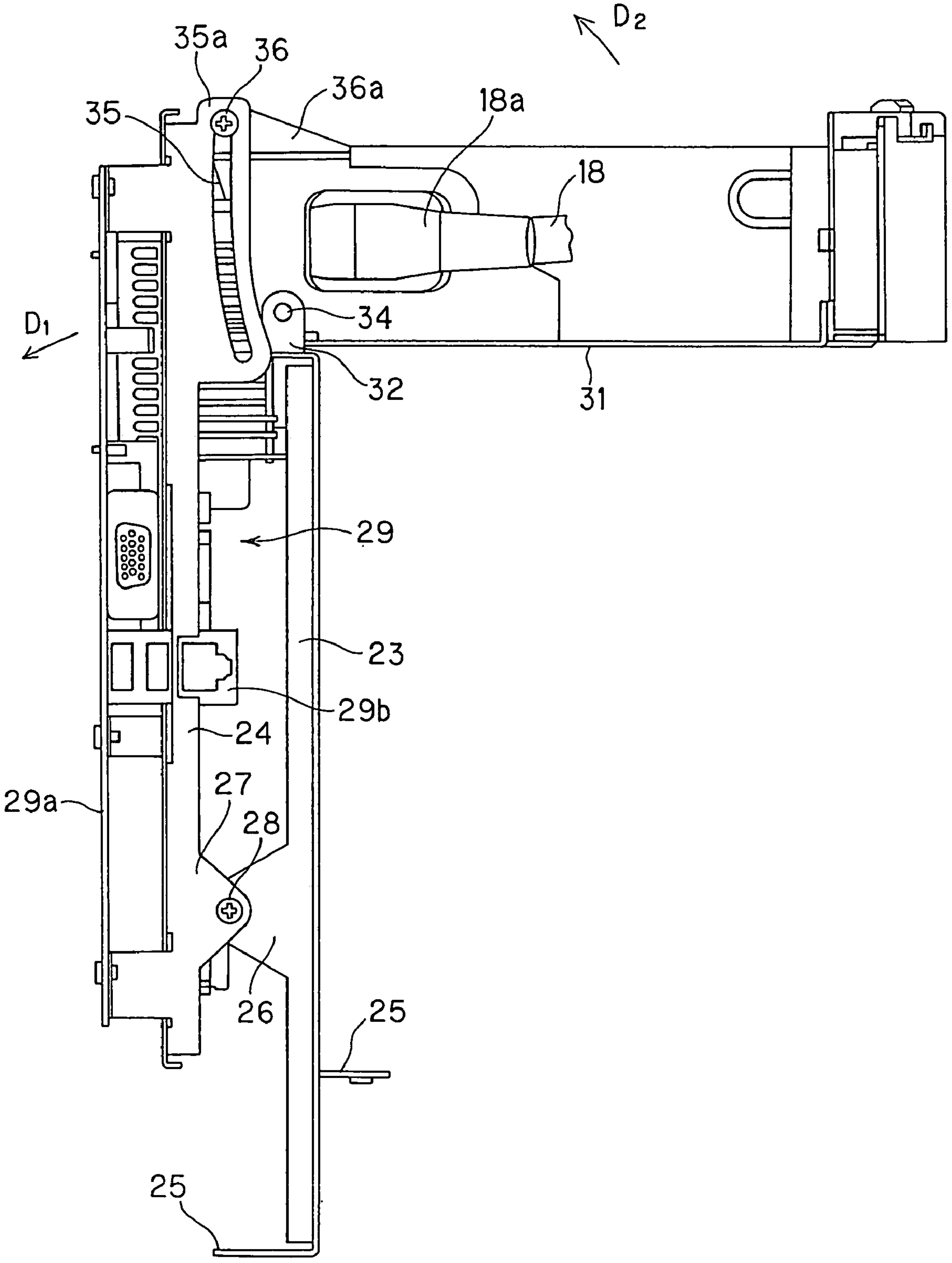
FIG. 7 is a side view showing a first rotary support plate and a second rotary support plate when the back surface panel and the top plate panel are attached or when the back surface panel and the top plate panel are attachable.

As shown in FIGS. 6 and 7, in the main body part 11, a base 23 and a first rotary support plate 24 attached to the base 23 so as to freely rotate are incorporated. As shown in FIG. 7, the base 23 is a plate shaped body formed in a substantially rectangular shape by a sheet metal working and a plurality of fixing pieces 25 for substantially vertically fixing the base to the bottom surface part 14 are provided in one short side. On each of the fixing pieces 25, a through hole that is not illustrated in the drawings is pierced. The base 23 is fixed to the bottom surface part 14 by inserting setscrews into the through holes of the fixing pieces 25. In the base 23, a support piece 26 is provided in the bottom surface part 14 side. To the support piece 26, the first rotary support plate 24 in which the control circuit part of the monitoring camera 10 is incorporated is attached to freely rotate.

The first rotary support plate 24 is formed in a substantially rectangular shape by a sheet metal working and a protruding piece 27 is provided in one short side thereof. The first rotary support plate 24 is supported on the base 23 so as to freely rotate on a setscrew 28 as a supporting point of rotation by overlapping the support piece 26 of the base 23 on the protruding piece 27 and inserting the setscrew 28 into axial holes pierced on the respective pieces.

In the first rotary support plate 24, the control circuit part 29 for controlling the entire part of the monitoring camera 10 is provided. Specifically, the control circuit part 29 has one or a plurality of printed-wiring boards **29*a* on which electronic parts such as a CPU (Central Processing Unit), a memory or the like are mounted and a jack 29*b* to with the network cable 19** is connected is mounted.

Further, in the base 23, on the other short side of the ceiling part 13 side, a support piece 32 for supporting a second rotary support plate 31 in which the power supply part is incorporated so as to freely rotate is provided. The second rotary support plate 31 is formed in a substantially rectangular shape by a sheet metal working and is provided with a protruding piece that is not illustrated in the drawing in the short side of the main body part 11 and the image pickup part 12 side. The second rotary support plate 31 is supported so as to freely rotate on the base 23 by overlapping the support piece 32 of the base 23 on the protruding piece and inserting a setscrew 34 into axial holes pierced on the respective pieces and taking the axial holes as a supporting point for rotation.

Since the power supply part disposed in the second rotary support plate 31 is disposed in the ceiling part 13, the rotary area of the second rotary support plate 31 needs to be regulated relative to the base 23. Thus, in the first rotary support plate 24, a slotted guide hole 35 is provided by which the rotary area of the second rotary support plate 31 is changed from a substantially vertical state to the base 23 to a state substantially continuously extending from the base 23. In the second rotary support plate 31, a protruding guide part 36 provided in a protruding piece **36*a* formed in the one short side and in the top plate panel 22 side is engaged with the guide hole. The guide hole 35 is formed upward and downward in a rise piece 35*a* formed in both side edges in the longitudinal direction of the ceiling part 13 side of the first rotary support plate 24 so that the guide part 36 of the second rotary support plate 31 rotates. Further, the guide hole 35 is curved to swell to the back surface panel 21 side so that the second rotary support plate 31 can rotate to be separated from the base 23 by the guide part 36**.

As described above, the power supply part 37 is provided in the second rotary support plate 31 that is attached to the base 23 so as to freely rotate. In the power supply part 37, a power supply jack not shown in the drawings to which a first connector **18*a* of the power supply cable 18 for externally supplying the electric power is electrically connected is provided. To the power supply jack provided in the power supply part 37, the first connector 18*a* only in a prescribed position can be electrically connected. When the second rotary support plate 31 in a substantially vertical state to the base 23, the first connector 18*a* is mounted on the power supply jack only under a position in which the power supply cable 18 is drawn out toward the front part of the main body part 11**.

The back surface panel 21 forming a part of the outer casing of the main body part 11 is substantially formed, as shown in FIG. 5, in a U-shape in section so as to cover the back surface and both side surfaces of the main body part 11 therewith. Through holes 41 are formed at positions near corner parts respectively on a surface serving as the back surface of the monitoring camera 10. On the other hand, on the bottom surface part 14 forming a part of the back surface of the main body part 11, attaching pieces 42 protrude to the main body part 11 side at both sides and attaching holes **42*a* are formed on the attaching pieces 42**.

On the top plate panel 22, through holes 43 are pierced in the substantially circular arc shaped end part and the intermediate parts of the long sides. Further, on the back surface side of the top plate panel 22, connecting pieces 44 to which the back surface panel 21 is attached protrude and attaching holes **44*a* are pierced on the connecting pieces 44. In the periphery of the power supply part 37 located inside a protruding piece 46 forming a part of the outer casing provided in the periphery of the light transmitting part 15, fixing parts 45 for fixing the top plate panel 22 are provided correspondingly to the through holes 43. On the fixing parts 45, tapped holes 45*a* are respectively pierced. The protruding piece 46 serves to close between the peripheral edge part of the light transmitting part 15, the top plate panel 22 and the back surface panel 21, and protrudes outward from the base end of the light transmitting part 15 so as to substantially form a trough by the light transmitting part 15 and the protruding piece 46**.

To attach the back surface panel 21 to the top plate panel 22, the top plate panel 22 is firstly attached to the ceiling part 13 so as to cover the power supply part 37 therewith as shown in FIG. 5. Then, setscrews 47 are inserted into the through holes 43 and fastened to the tapped holes **45*a* of the fixing parts 45 to fix the top plate panel 22. At this time, a rubber packing that is not shown in the drawings is provided between the protruding piece 46 and the top plate panel 22 to improve water-proof characteristics. Then, the back surface panel 21 is attached to the main body part 11 so as to cover the control circuit part 29 therewith. Then, setscrews 48 are inserted into the through holes 41 and fastened to the attaching holes 42***a* of the attaching pieces 42 on the bottom surface part 14 and to the attaching holes 44*a* of the connecting pieces 44 of the top plate panel 22 to fix the back surface panel 21 to the main body part 11. At this time, a rubber packing is also provided between the back surface panel 21 and the protruding piece 46 to improve water-proof characteristics.

When the back surface panel 21 is attached to the main body part 11 and the top plate panel 22 is attached to the ceiling part 13, the first rotary support plate 24 provided with the control circuit part 29 of the main body part 11 and the second rotary support plate 31 provided with the power supply part 37 of the ceiling part 13 are respectively located in states as shown in FIG. 7. That is, the first rotary support plate 24 rotates so as to come near to the base 23 to be in a state substantially parallel to the base 23 under which the control circuit part 29 is accommodated in the main body part 11. Further, the second rotary support plate 31 supported by the base 23 so as to freely rotate is located in a state substantially vertical to the base 23 under which the power supply part 37 is accommodated in the ceiling part 13. At this time, the first connector 18*a* is mounted on the power supply jack only under the position in which the power supply cable 18 is drawn out toward the front part of the main body part 11. The base end part of the power supply cable 18 is located inside the protruding piece 46 provided in the periphery of the light transmitting part 15.

In case the monitoring camera 10 is installed at the prescribed position of the outer wall 2 of the building 1, when the plug socket is present at a remote position and the length of the existing power supply cable 18 is insufficient, the existing power supply cable needs to be replaced by the long power supply cable 18. In such a case, when the power supply cable 18 needs to be replaced by a new power supply cable, or when the maintenance of the control circuit part 29 or the power supply part 37 is carried out, the setscrews 48 of the back surface panel 21 are detached to detach the back surface panel 21 from the main body part 11. Then, the setscrews 47 are detached from the top plate panel 22 to detach the top plate panel 22 from the ceiling part 13. Thus, the control circuit part 29 and the power supply part 37 are exposed.

Figure 8:
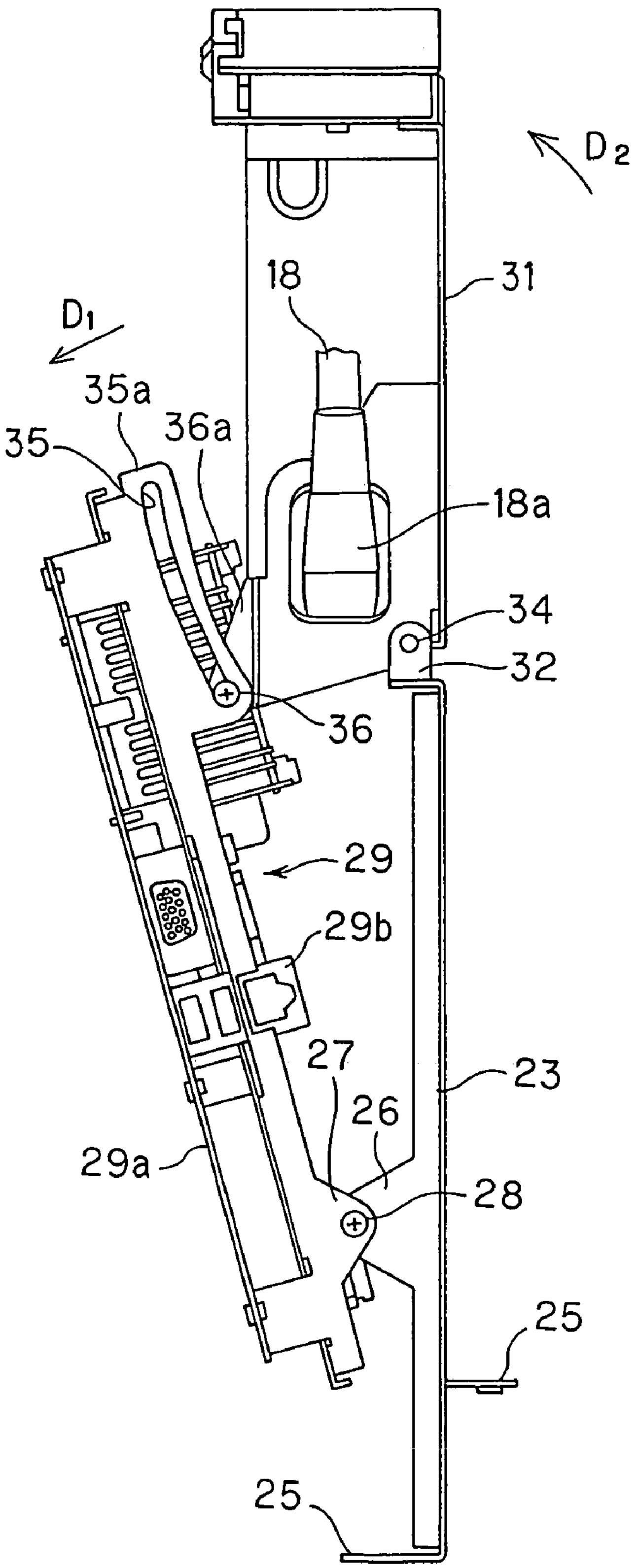
FIG. 8 is a side view showing the first rotary support plate and the second rotary support plate when a connector of a power supply cable is detachably attached.

As shown in FIG. 7, under a state that the back surface panel 21 is detached form the main body part 11 and the top plate panel 22 is detached from the ceiling part 13, the first connector 18*a* of the power supply cable 18 is mounted under a state in which the base end part of the power supply cable 18 is drawn out forward. Accordingly, the base end part of the power supply cable 18 is hidden inside the protruding piece 46 forming a part of the outer casing, so that the first connector 18*a* is hardly detached and attached. Thus, when the power supply cable 18 is replaced by a new power supply cable, as shown in FIGS. 7 and 8, the second rotary support plate 31 provided with the power supply part 37 to which the power supply cable 18 is connected is rotated to a direction shown by an arrow mark D1 as a back surface side in FIGS. 7 and 8. That is, when the second rotary support plate 31 is in an initial state substantially vertical to the base 23, the guide part 36 of the second rotary support plate 31 engaging with the guide hole 35 of the first rotary support plate 24 is engaged with the upper end of the guide hole 35 of the first rotary support plate 24 in the top plate panel 22 side. When the second rotary support plate 31 is rotated in the direction shown by the arrow mark D1 in FIGS. 7 and 8 from this initial state, the guide part 36 of the second rotary support plate 31 moves from the upper end part of the guide hole 35 to a lower end part of the bottom surface part 14 side, as the second rotary support plate 31 rotates. Then, the first rotary support plate 24 is pressed to the back surface panel 21 side to rotate the first rotary support plate 24 in a direction shown by an arrow mark D2 in FIGS. 7 and 8 to separate the first rotary support plate 24 from the base 23. Thus, as shown in FIG. 8, the first rotary support plate 24 is separated from the base 23. The guide part 36 moves to the lower end part of the guide hole 35 so that the second rotary support plate 31 is rotated by about 90 degrees in the direction shown by the arrow mark D2 in FIGS. 7 and 8 so as to be continuously extended from to the first rotary support plate 24 separated from the base 23.

The upper part of the main body part 11 is an area in which the component parts of the monitoring camera 10 are not provided. The first connector 18*a* of the power supply cable 18 mounted on the jack of the power supply part 37 is moved to the upper part of the main body part 11 from a state that the base end part of the power supply cable 18 is hidden by the protruding piece 46. Thus, the base end part of the power supply cable 18 drawn out upward. Accordingly, a user can easily detachably attach the first connector 18*a*.

When the second rotary support plate 31 in which the power supply part 37 is provided is returned to the state shown in FIG. 7 from the state shown in FIG. 8, the second rotary support plate 31 in which the power supply part 37 is provided may be rotated in a direction opposite to the direction shown by the arrow mark D1 in FIGS. 7 and 8. Thus, the guide part 36 moves from the lower end part to the upper end part of the guide hole 35 so that the first rotary support plate 24 in which the control circuit part 29 is provided is drawn near to the base 23 to be substantially parallel to the base 23. At the same time, the second rotary support plate 31 is positioned in a state substantially vertical to the base 23. Thus, the back surface panel 21 or the top plate panel 22 can be attached to the main body part 11.

Further, the network cable 19 is provided on the side surface of the control circuit part 29. Thus, the connector of the network cable 19 can be attached and detached in any of the state shown in FIG. 7 and the state shown in FIG. 8.

The power supply cable 18 is drawn out to an external part through the recessed part 17 provided in the bottom surface part 14 shown in FIG. 3 from the first connector 18*a* mounted on the jack of the power supply part 37. Accordingly, when the power supply cable 18 is replaced by a new power supply cable, the power supply cable 18 needs to be pulled out from the recessed part 17. On the other hand, in an area of the recessed part 17 in which the power supply cable 18 or the network cable 19 is inserted, a space may be formed. Accordingly, water may enter an inner part from this space. Thus, in the recessed part 17, the power supply cable 18 is held in a water-proof state. Then, when the power supply cable 18 is replaced by the new power supply cable, the power supply cable 18 is changed after a cable holding mechanism of the power supply cable 18 is detached.

Figure 9:
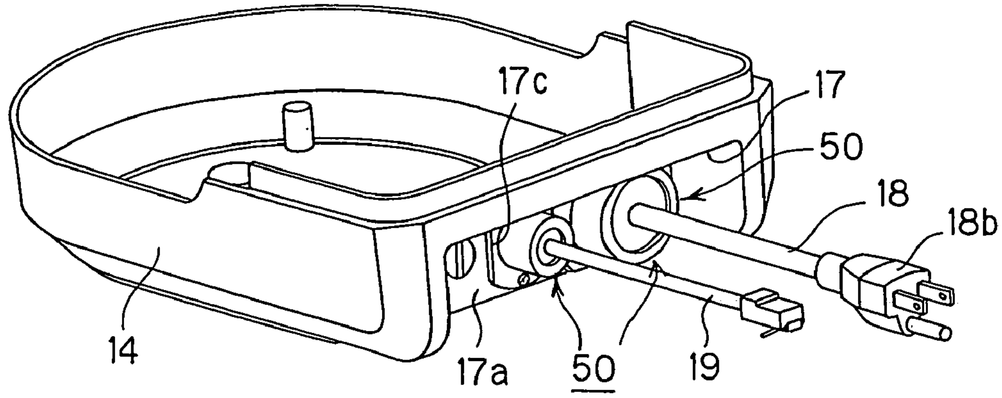
FIG. 9 is a perspective view showing a cable holding mechanism of the power supply cable.

The cable holding mechanism 50 is provided in the recessed part 17 formed in the corner part of the bottom surface part 14 in the back surface side as shown in FIG. 9. In this recessed part 17, a drawing out part of the power supply cable 18 and a drawing out part of the network cable 19 are provided.

The cable holding mechanism provided in the drawing out part of the power supply cable 18 and the cable holding mechanism that is provided in the drawing out part of the network cable 19 have the same mechanism. Thus, the cable holding mechanism of the power supply cable 18 will be described below as an example.

Figure 10:
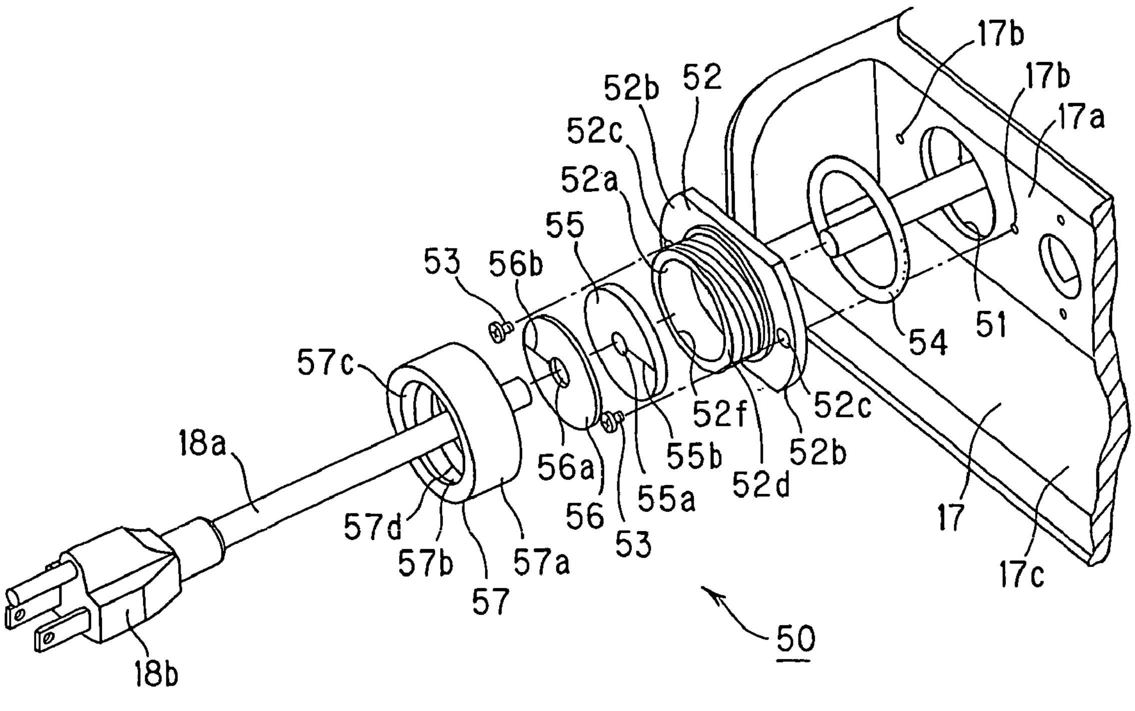
FIG. 10 is an exploded perspective view showing the power supply cable.

The cable holding mechanism 50 of the power supply cable 18 is provided in an insert hole 51 formed in a bottom surface 17*a* of the recessed part 17 as shown in FIG. 10. The insert hole 51 is formed in a substantially circular shape and has a size into which at least a second connector 18*b* of the power supply cable 18 electrically connected to a plug socket for supplying electric power to the monitoring camera 10 can be inserted.

To the bottom surface 17*a* of the recessed part 17, a first holder 52 is attached in the periphery of the insert hole 51. The first holder 52 includes a tubular part 52*a* and an attaching piece 52*b* protruding and formed from one end of the tubular part 52*a*. The tubular part 52*a* has a through hole 52*f* having a size into which at least the second connector 18*b* can be inserted. The attaching piece 52*b* is provided with through holes 52*c* into which setscrews 53 are inserted when the setscrews 53 are fastened to attaching holes 17*b* provided in the vicinity of the insert hole 51 of the bottom surface 17*a* of the recessed part 17. On the outer peripheral surface of the tubular part 52*a*, a thread groove 52*d* to which a second holder is fastened is formed. Further, on a surface of the first holder 52 opposed to the bottom surface 17*a* of the recessed part 17, an annular fitting protrusion 52*g* fitted to the insert hole 51 of the bottom surface 17*a* is formed.

On the surface of the first holder 52 opposed to the bottom surface 17*a* of the recessed part 17, a groove part 52*e* is provided in the outer peripheral side of the tubular part 52*a*. In this groove part 52*e*, a rubber packing 54 serving as a first packing is disposed. The rubber packing 54 is, for instance, an O ring to prevent the entry of a water content from a part between the first holder 52 and the bottom surface 17*a* of the recessed part 17 and hold a water-tightness between the bottom surface 17*a* of the recessed part 17 and the first holder 52.

The tubular part 52*a* of the first holder 52 is closed by a rubber packing 55 serving as a second packing. The rubber packing 55 is formed in a substantially circular shape and has an outside diameter slightly larger than the outside diameter of the tubular part 52*a* so as to close the opening of the tubular part 52*a*. Further, the rubber packing 55 has at a central part an insert hole 55*a* into which the power supply cable 18 is inserted. The insert hole 55*a* is formed to be slightly smaller than the diameter of the power supply cable 18 so that the peripheral surface of the insert hole 55*a* comes into tightly contact with the outer peripheral surface of the power supply cable 18. Further, the rubber packing 55 has a slit 55*b* formed from its outer peripheral edge to the insert hole 55*a*. The power supply cable 18 elastically displaces the rubber packing 55 to be inserted into the insert hole 55*a* at the central part through the slit 55*b*.

On the rubber packing 55, a washer 56 for preventing the distortion of the rubber packing 55 upon fastening is disposed. The washer 56 is formed to have an outside diameter having substantially the same diameter as that of the rubber packing 55, an insert hole 56*a* at a central part through which the power supply cable 18 is inserted, and a slit 56*b* formed from its outer peripheral edge to the insert hole 56*a*. The washer 56 is formed with plastic. This washer 56 is liable to slip relative to the rubber packing 55. Further, the washer 56 is entirely displaced to insert the power supply cable into the insert hole 56*a* at the central part through the slit 56*b*.

The insert hole 56*a* of the washer 56 is not provided for the purpose of water-proof means of the washer 56, but for the purpose of protecting the washer 56 as well as for preventing the distortion of the rubber packing 55, the insert hole 56*a* has a diameter substantially the same as or larger than the axial diameter of the power supply cable 18.

A second holder 57 is fastened to the first holder 52 through the above-described rubber packing 55 and the washer 56. In the second holder 57, a pressing piece 57*b* is formed to protrude to an inner peripheral side from one end of a substantially cylindrical peripheral wall 57*a*. When the second holder 57 is fastened to the first holder 52, the pressing piece 57*b* presses the washer 56. In an inner side of the pressing piece 57*b*, an opening part 57*c* having a size into which the first connector 18*a* of the power supply cable 18 can be inserted is formed. Further, in the inner peripheral surface of the peripheral wall 57*a*, a thread groove 57*d* screwed to the thread groove 52*d* formed on the outer peripheral wall of the tubular part 52*a* of the first holder 51 is formed.

Now, an attaching method of the cable holding mechanism 50 constructed as described above will be described by referring to FIGS. 10 and 11. Firstly, the power supply cable 18 electrically connected to the above-described power supply part 37 is inserted into the insert hole 51 of the bottom surface 17*a* of the recessed part 17 by using, for instance, the second connector 18*b* as an insert end. Further, the power supply cable 18 inserted into the insert hole 51 of the bottom surface 17*a* of the recessed part 17 is further inserted into the through hole of the tubular part 52*a* of the first holder 52 by using, for instance, the second connector 18*b* as an inserting side. In the groove part 52*e* of the first holder 52, the rubber packing 54 is disposed. After that, in the first holder 52, the fitting protrusion 52*g* is fitted to the insert hole 51. The setscrews 53 are inserted into the through holes 52*c* of the attaching piece 52*b* and fastened to the attaching holes 17*b* of the bottom surface 17*a* of the recessed part 17 so that the first holder 52 is attached to the recessed part 17. The first holder 52 is fastened to the bottom surface 17*a* of the recessed part 17 by the setscrews 53, so that the rubber packing 54 between the first holder 52 and the bottom surface 17*a* of the recessed part 17 is compressed to ensure the waster-tightness between the first holder 52 and the bottom surface 17*a* of the recessed part 17.

Further, to the power supply cable 18, the rubber packing 55 is attached. Specifically, the rubber packing 55 is elastically displaced so that the power supply cable 18 is inserted into the insert hole 55*a* through the slit 55*b*. Further, to the power supply cable 18, the washer 56 is attached in the second connector 18 side adjacent to the rubber packing 55. Specifically, the washer 56 is elastically displaced so that the power supply cable 18 is inserted into the insert hole 56*a* through the slit 56*b*.

When the rubber packing 55 and the washer 56 are attached to the power supply cable 18, in the tubular part 52*a* of the first holder 52 attached to the bottom surface 17*a* of the recessed part 17, the rubber packing 55 to which the power supply cable 18 is attached is disposed so as to close the through hole 52*f* formed by the tubular part 52*a*. Further, the washer 56 attached to the power supply cable 18 is disposed so as to be superimposed on the rubber packing 55.

Figure 12:
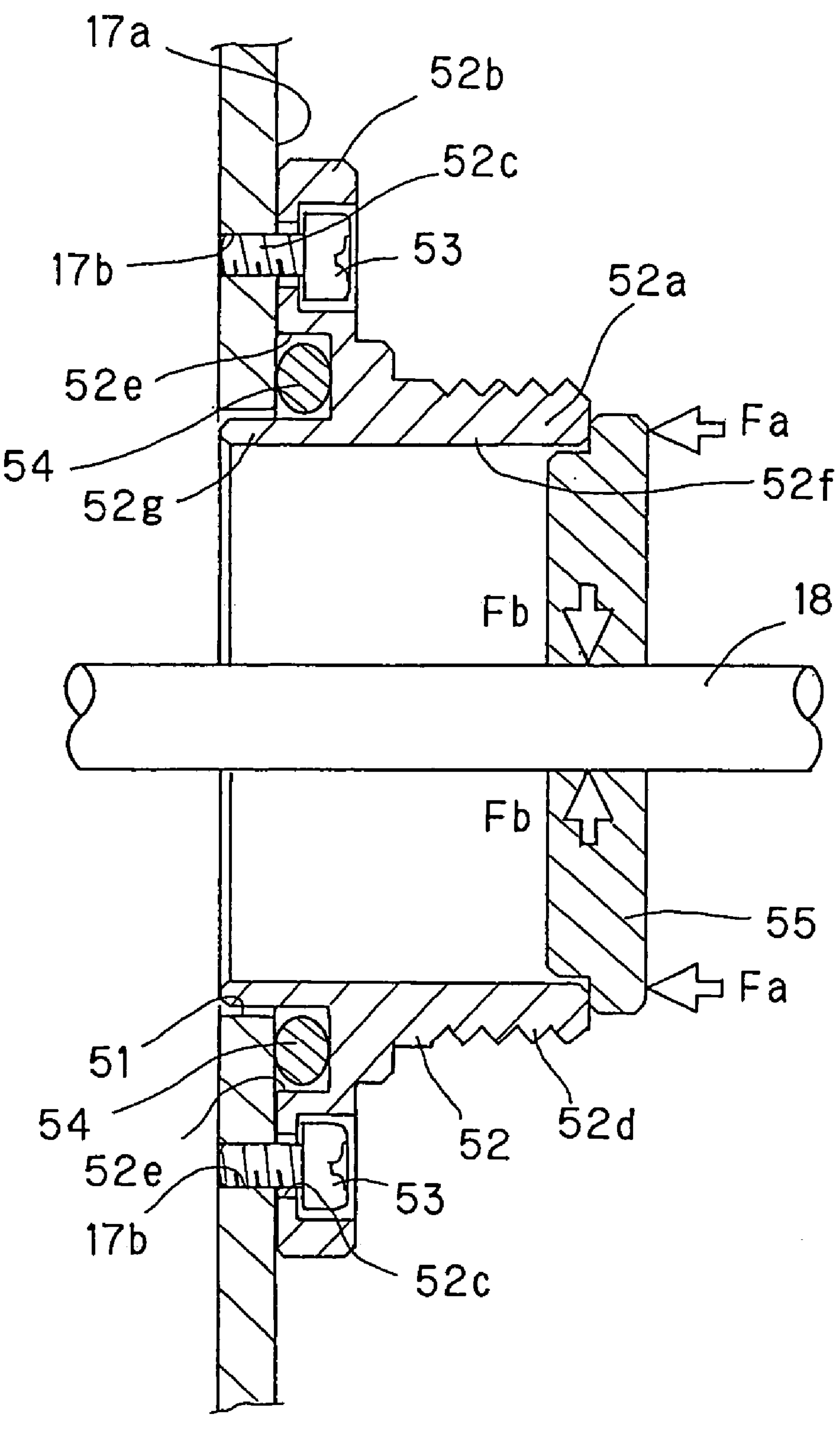
FIG. 12 is a sectional view showing the operation of a rubber packing of the cable holding mechanism.

When the rubber packing 55 and the washer 56 are disposed in a superimposed state on the tubular part 52*a* of the first holder 52, the thread groove 57*d* of the second holder 57 is screwed to the thread groove 52*d* of the tubular part 52*a* of the first holder 52. When the first holder 52 is fastened by the second holder 57, the washer 56 is pressed by the pressing piece 57*b* of the second holder 57 to thus press and compress the rubber packing 55 from a direction shown by Fa shown in FIG. 12. As shown in FIG. 12, the rubber packing 55 is compressed by the washer 56 to bite into the tubular part 52*a* of the first holder 52 and expand in the radial direction. Then, the diameter of the insert hole 55*a* of the rubber packing 55 is reduced in a direction shown by Fb in FIG. 12. Thus, the inner peripheral surface of insert hole 55*a* is pressed in contact with the outer peripheral surface of the power supply cable. Accordingly, the water-tightness in the periphery of the power supply cable 18 is assured.

In the cable holding mechanism 50 as described above, when a work is carried out that the power supply cable 18 connected to the power supply part 37 is replaced by a new power cable, while at least the second holder 57 is detached from the first holder 52 and the rubber packing 55 and the washer 56 are detached from the power supply cable 18, the power supply cable 18 can be easily pulled out and inserted through the insert hole 51 provided in the bottom surface 17*a* of the recessed part 17 and the tubular part 52*a* of the first holder 52. Then, when the second holder 57 is attached to the first holder 52 through the rubber packing 55 and the washer 56, the rubber packing 55 is compressed through the washer 56 under the pressing force Fa when the second holder 52 is fastened to the tubular part 52*a* of the first holder 52. Thus, the diameter of the insert hole 55*a* of the rubber packing 55 is reduced in the direction shown by the arrow mark Fb in FIG. 12. Accordingly, the inner peripheral surface of the insert hole 55*a* is pressed in contact with the outer peripheral surface of the power supply cable 18 to assure the water-tightness in the periphery of the power supply cable 18. Further, when the first holder 52 is attached to the bottom surface 17*a* of the recessed part 17, the rubber packing 54 is compressed in the groove part 52*e* to be pressed to the bottom surface 17*a,* so that the water-tightness can be assured between the first holder 52 and the bottom surface 17*a* of the recessed part 17.

Further, while the second holder 57 is attached to the first holder 52, an upper surface 58*e* of the second holder 57 is located at a position lower than an upper surface 17*c* of the recessed part 17. Accordingly, the upper surface 17*c* of the recessed part 17 functions as a roof part of the cable holding mechanism 50 so that the cable holding mechanism is prevented from being directly exposed to wind and rain.

The diameters of the insert hole 51 of the bottom surface 17*a,* the through hole 52*f* of the tubular part 52*a* of the first holder 52 and the opening in the inner peripheral side of the pressing piece 57*b* of the second holder 57 may have sizes through which at least any one of the connectors 18*a* and 18*b* of the power supply cable 18 can be inserted. Thus, the cable holding mechanism is not limited to the above-described embodiment.

Further, the cable holding mechanism used in the drawing out part of the network cable 19 in the recessed part 17 may be formed in such a way that the diameters of the insert hole 51 of the bottom surface 17*a,* the through hole 52*f* of the tubular part 52*a* of the first holder 52 and the opening in the inner peripheral side of the pressing piece 57*b* of the second holder 57 have sizes through which at least any one of the connectors of the network cable 19 can be inserted.

The monitoring camera 10 constructed as described above includes, as shown in FIG. 1, the ceiling part 13 in one end side in the longitudinal direction of the substantially rectangular main body part 11, the bottom surface part 14 provided in the other end side, and the image pickup part 12 in the front part of the main body part 11 held between the ceiling part 13 and the bottom surface part 14. Accordingly, the monitoring camera 10 can be disposed on the outer wall 2. Since the monitoring camera 10 is disposed outdoors, the outer casing has a water-proof structure and is sealed. However, as shown in FIG. 5, the power supply part 37 is contained in the upper ceiling part 13 and the control circuit part 29 is contained in the main body part 11 in the lower part of the power supply part 37. Thus, the control circuit part 29 can be prevented from being failed due to the heat generated by the power supply part 37.

Further, in the monitoring camera 10, when the work that the power supply cable is replaced by a new power supply cable upon installation thereof is necessary, the setscrews 48 on the back surface panel 21 are firstly detached to detach the back surface panel 21 from the main body part 11. Then, the setscrews 47 are detached from the top plate panel 22 to detach the top plate panel 22 from the ceiling part 13 and expose the control circuit part 29 and the power supply part 37. Accordingly, a work for exposing the control circuit part 29 or the power supply part 37 can be simplified. After the back surface panel 21 and the top plate panel 22 are detached, as shown in FIGS. 7 and 8, the second rotary support plate 31 in which the power supply part 37 to which the power supply cable 18 is connected is provided is rotated to the back surface side, that is, in the direction shown by the arrow mark D1 in FIGS. 7 and 8 to separate the first rotary support plate 24 from the base 23. The second rotary support plate 31 is rotated in the direction shown by the arrow mark D2 in FIGS. 7 and 8 so as to be continuously extended from the first rotary support plate 24 separated from the base 23. Accordingly, the first connector 18*a* of the power supply cable 18 mounted on the jack of the power supply part 37 can be easily detachably attached without interfering with the protruding piece 46.

Figure 11:
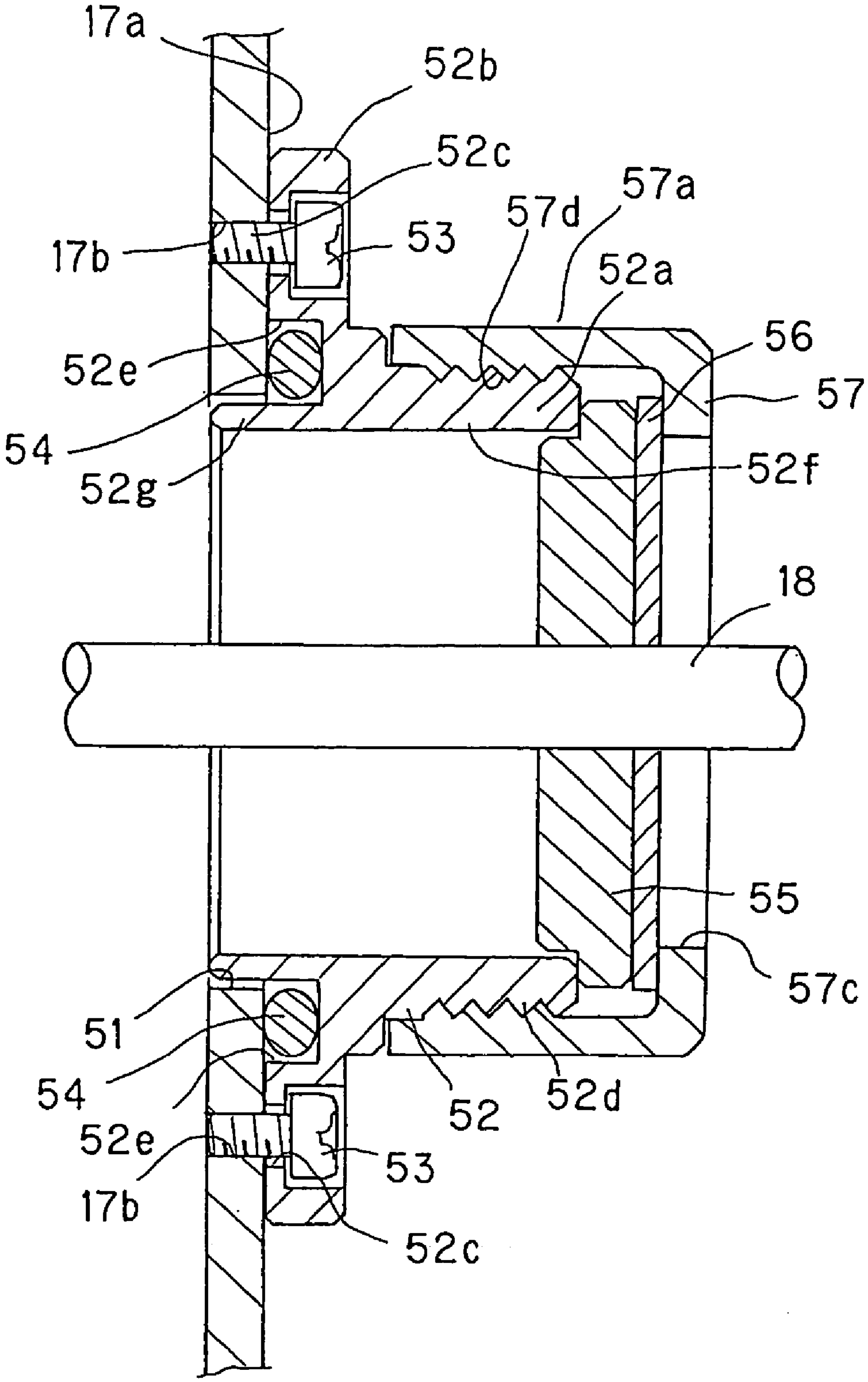
FIG. 11 is a sectional view showing the assembled state of the cable holding mechanism of the power supply cable.

Still further, when the power supply cable 18 or the network cable 19 is inserted into or pulled out from the recessed part 17 of the bottom surface part 14, as shown in FIGS. 10 and 11, at least the second holder 57 is detached from the first holder 52. While the rubber packing 55 and the washer 56 are detached from the power supply cable 18 or the network cable 19, the power supply cable 18 can be easily pulled out or inserted through the insert hole 51 provided in the bottom surface 17*a* of the recessed part 17 and the tubular part 52*a* of the first holder 52. The cable holding mechanism 50 is disposed in the bottom surface part 14 forming the outer casing. Thus, the water-proof function of the cable holding mechanism can be assuredly exhibited without depending on the skill of a setter.

Further, in the cable holding mechanism 50, the rubber packing 55 is compressed through the washer 56 by the pressing force Fa when the second holder 57 is fastened to the tubular part 52*a* of the first holder 52. Thus, the diameter of the insert hole 55*a* of the rubber packing 55 is reduced in the direction shown by the arrow mark Fb in FIG. 12. In such a manner, the inner peripheral surface of the insert hole 55*a* is pressed in contact with the outer peripheral surface of the power supply cable 18. Accordingly, the water-tightness in the periphery of the power supply cable 18 can be assured. Further, when the first holder 52 is attached to the bottom surface 17*a* of the recessed part 17, the rubber packing 54 is compressed in the groove part 52*e* to be pressed to the bottom surface 17*a,* so that the water-tightness can be assured between the first holder 52 and the bottom surface 17*a* of the recessed part 17.

In the above-described embodiment, the present invention applied to the monitoring camera 10 is described as an example. The present invention is not limited to this example and may be applied to, for instance, a portable digital or analog still camera or a video camera.

It is apparent for a person with ordinary skill in the art that the present invention is not limited to the above-described embodiment explained by referring to the drawings and various kinds of changes, substitutions or equivalence thereto may be made without departing the attached claims and the gist thereof.

INDUSTRIAL APPLICABILITY

As described above, in the image pickup device according to the present invention, since the control circuit part is provided in the main body part and the power supply part is provided in the ceiling part in the upper side of the main body part, the control circuit part can be prevented from being failed due to the heat generated by the power supply part.

Further, the first rotary support plate in which the control circuit part is provided is attached to the base substantially vertically fixed to the main body part and the bottom surface part so as to freely rotate to come near to or to be separated from the base. Further, the second rotary support plate having the power supply part connected to the first rotary support plate is substantially vertically attached to the base. The first rotary support plate is rotated to be separated from the base and the second rotary support plate is rotated to be connected to the first rotary support plate separated from the base. Accordingly the connector electrically connected to the power supply part can be easily attached and detached.

The invention claimed is:

1. An image pickup device comprising:

a main body part in which a control circuit part is housed;

an image pickup part for housing an image pickup element in a front surface side of the main body part and having a front surface formed in a spherical shape with a light transmitting property;

a ceiling part provided in an upper side of the main body part and the image pickup part, and having a power supply part housed therein;

a bottom surface part disposed in a lower side of the main body part and the image pickup part, wherein the main body part includes a back surface panel forming a part of an outer casing; and the ceiling part includes a top plate panel forming a part of the outer casing and the back surface panel and the top plate panel are detachable, and wherein the main body part includes a base vertically fixed to the bottom surface part, and a first rotary support plate having the control circuit part and supported on the bottom surface side of the base so as to freely rotate;

the ceiling part includes the power supply part, and a second rotary support plate supported on the ceiling part side of the base so as to freely rotate and having a rotary area regulated by the first rotary support plate;

when the back surface panel and the top plate panel are attached, the first rotary support plate is in a state parallel to the base and the second rotary support plate is in a state perpendicular to the base; and when the back surface panel and the top plate panel are detached, the first rotary support plate can rotate so as to be separated from the base and the second rotary support plate can rotate so as to be continuously connected to the base.

2. The image pickup device according to claim 1, wherein a connector provided in one end of a power supply cable externally inserted into the power supply part through the main body part is electrically connected to the power supply part; and when the second rotary support plate is in the state vertical to the base, the connector is electrically connected to the power supply part in a position where the power supply cable is drawn out forward.

3. The image pickup device according to claim 1, wherein the image pickup device is installed along a wall surface.

* * * * *